(No Model.)
C. W. MUNZ.
GAME.
No. 434,674. Patented Aug. 19, 1890.
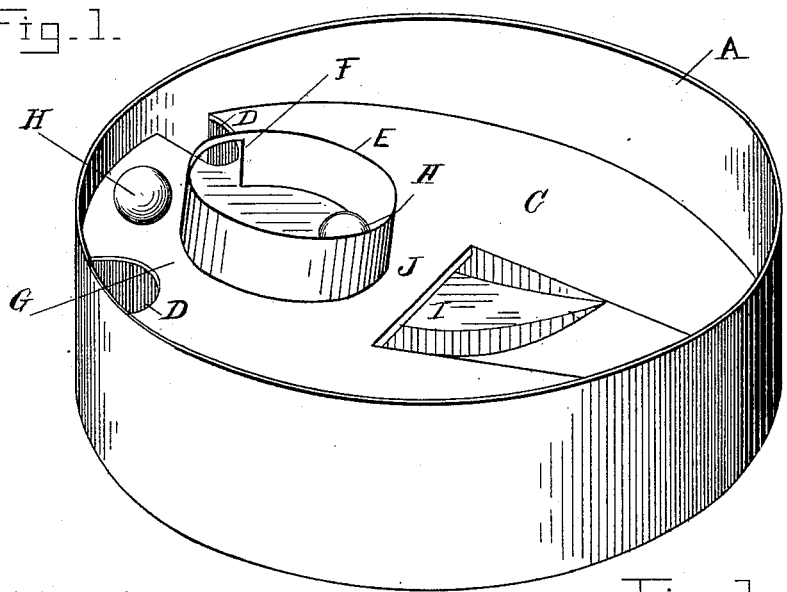
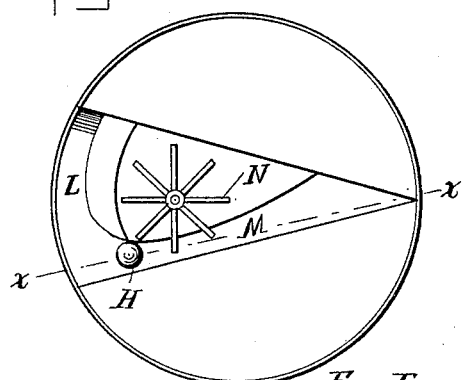
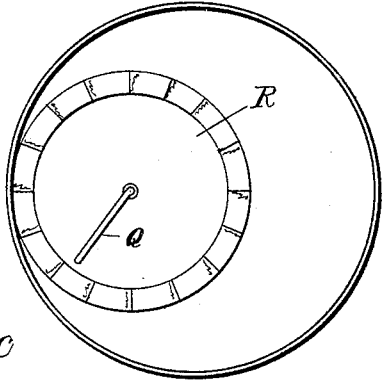
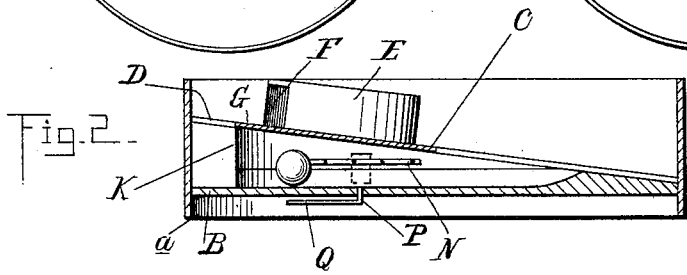
Witnesses
M. B. Dogherty
P. M. Hulbert
Inventor
Charles W Munz
By Mos. S. Sprague & Son
Atty.

UNITED STATES PATENT OFFICE.

CHARLES W. MUNZ, OF DETROIT, MICHIGAN.

GAME.

SPECIFICATION forming part of Letters Patent No. 434,674, dated August 19, 1890.

Application filed May 5, 1890. Serial No. 350,582. (No model.)

*To all whom it may concern:*

Be it known that I, CHARLES W. MUNZ, a citizen of the United States, residing at Detroit, in the county of Wayne and State of Michigan, have invented certain new and useful Improvements in Games, of which the following is a specification, reference being had therein to the accompanying drawings.

This invention relates to new and useful games; and the invention consists in the peculiar construction of a receptacle having an inclined floor apertured at the highest point of said floor, a smaller apertured receptacle or cage upon said inclined floor, and spheres within the receptacle which are designed to be placed within the cage, and, further, in the combination, with the parts before described, of a wheel operating an index, in combination with a fortune-telling card, whereby, when the spheres are all caged the fortune of the player is supposed to be given by reading that portion of the card to which the index points, and, further, in the peculiar construction and arrangement of the various parts, all as more fully hereinafter described.

In the drawings which accompany this specification, Figure 1 is a perspective view of my device. Fig. 2 is a vertical section therethrough on line $x\ x$, Fig. 4. Fig. 3 is a bottom plan view. Fig. 4 is a top plan view of the receptacle with the inclined floor removed.

A is the box or receptacle, preferably of circular shape, which has the bottom B, the sides of the receptacle having an extension $a$ below the bottom, so that it will be slightly raised above the plane upon which the receptacle rests.

C is an inclined floor resting with its lowest point upon the bottom B. This floor at or near its highest point is provided with apertures D, and between these apertures is secured the cage E, consisting of an annular flange attached to the floor C, and having a suitable entrance F located in proximity to the apertures D in the floor. A runway G is formed around the upper edge of the cage between the apertures D and said cage.

H are spheres, which may be of any suitable number, which it is designed to place by a clever manipulation and balancing within the cage by causing them to enter through the aperture F, which is difficult to do in view of the inclined floor and the proximity of the apertures D in the floor.

I preferably cut away the floor at I, so that there is a narrow runway J around the lower edge of the cage as well as the top. Between the floor C and the bottom B is the chamber K, into which the spheres will fall if they enter the apertures D, which some of them are sure to do while getting the others into the cage.

L is a common runway below both of the apertures D, which connects into the runway M, extending to the lowest point of the floor.

N is a spider or turnstile, the spokes of which are arranged across the runway M, so that the marbles or spheres in passing down the runway will strike against the spokes and turn the wheel. This spider is secured upon the shaft P, which extends through the bottom of the receptacle and has an index Q at its lower end. Upon the bottom of the box is secured a circular card R, around the circumference of which is placed a number of sentences describing the various conditions of life.

The parts being thus constructed and arranged, they are intended to operate as follows: The player places a suitable number of spheres within the receptacle and by proper manipulation gets all of the spheres within the cage. While doing this one or more of the spheres will pass through the apertures D into the runway L and from thence through the runway M upon the floor C, and in this movement the spider N will be rotated and the index will be correspondingly turned. When the player has finally succeeded in getting all of the spheres within the cage, he places his finger upon the index and holds it in its adjusted position, and by reading the sentences to which it points is supposed to have his fortune told. The game thus combines the requirement of much skill to move the spheres into the cage, together with the fortune-telling device attached to it.

What I claim as my invention is—

1. A game apparatus consisting of a receptacle having apertures in its bottom near its edge, a cage having an opening in its upper edge between the apertures, a runway between the cage and apertures, and a runway below the receptacle leading back into the same, substantially as described.

2. A game comprising the receptacle A, having floor-apertures D and chamber K, and the cage E, having apertures F arranged in the runway between the apertures D, substantially as described.

3. A game comprising a receptacle, and spheres in said receptacle adapted to be moved into a cage by manipulation of the receptacle of a runway for said spheres, a turnstile across said runway adapted to be moved by said spheres, an index turned by said turnstile, and a chart around said index, substantially as described.

4. In combination with a receptacle, a sphere or spheres designed to be moved to an inner receptacle, a card, and an index operated by the movement of said spheres, substantially as described.

5. A game comprising the following elements: A receptacle, the bottom B, floor C, chamber K between pits D, cage E, apertures F therein, runways L M, turnstile N O, shaft P, index-finger Q, and chart R, substantially as described.

In testimony whereof I affix my signature, in presence of two witnesses, this 5th day of April, 1890.

CHARLES W. MUNZ.

Witnesses:
M. B. O'DOGHERTY,
P. M. HULBERT.